(12) United States Patent
Akiyoshi et al.

(10) Patent No.: US 9,103,384 B2
(45) Date of Patent: Aug. 11, 2015

(54) ROTATION TRANSMISSION DEVICE

(75) Inventors: Koji Akiyoshi, Iwata (JP); Takahide Saito, Iwata (JP)

(73) Assignee: NTN CORPORATION, Osaka (JP)

( * ) Notice: Subject to any disclaimer, the term of this patent is extended or adjusted under 35 U.S.C. 154(b) by 95 days.

(21) Appl. No.: 13/980,081

(22) PCT Filed: Jan. 20, 2012

(86) PCT No.: PCT/JP2012/051207
§ 371 (c)(1),
(2), (4) Date: Aug. 5, 2013

(87) PCT Pub. No.: WO2012/099244
PCT Pub. Date: Jul. 26, 2012

(65) Prior Publication Data
US 2013/0299298 A1    Nov. 14, 2013

(30) Foreign Application Priority Data

Jan. 21, 2011 (JP) .................................. 2011-010628

(51) Int. Cl.
*F16D 15/00* (2006.01)
*F16D 27/102* (2006.01)
*F16D 41/10* (2006.01)

(52) U.S. Cl.
CPC .............. *F16D 15/00* (2013.01); *F16D 27/102* (2013.01); *F16D 41/105* (2013.01)

(58) Field of Classification Search
CPC .................................................... F16D 27/102
See application file for complete search history.

(56) References Cited

U.S. PATENT DOCUMENTS

| | | | |
|---|---|---|---|
| 6,109,408 A | 8/2000 | Ikeda et al. | |
| 6,585,093 B2 * | 7/2003 | Hara et al. ........................ | 192/35 |
| 6,761,662 B2 * | 7/2004 | Iwazaki et al. ............. | 192/84.96 |
| 2005/0269183 A1 | 12/2005 | Ohtsuka et al. | |

(Continued)

FOREIGN PATENT DOCUMENTS

| | | |
|---|---|---|
| JP | 10-292829 | 11/1998 |
| JP | 2002-115730 | 4/2002 |

(Continued)

OTHER PUBLICATIONS

International Search Report issued Mar. 6, 2012, in International (PCT) Application No. PCT/JP2012/051207.

(Continued)

*Primary Examiner* — Rodney H Bonck
(74) *Attorney, Agent, or Firm* — Wenderoth, Lind & Ponack, L.L.P.

(57) ABSTRACT

A rotation transmission device includes an outer ring having an inner cylindrical surface, and an inner ring having outer cam surfaces. A pair of rollers and an elastic member biasing the rollers away from each other are mounted between the cylindrical surface and each adjacent pair of the cam surfaces. The rollers and the elastic members are retained by a control retainer and a rotary retainer each having a flange and crossbars extending from the flange and circumferentially alternating with the crossbars of the other retainer. The respective opposed pairs of rollers are pushed by the respective crossbars to a disengaged position when the retainers rotate relative to each other. The crossbars of the retainers are disposed between the outer ring and the inner ring and the flanges are provided outside the outer ring to minimize the axial length of the outer ring.

11 Claims, 6 Drawing Sheets

(56) References Cited

U.S. PATENT DOCUMENTS

| | | | |
|---|---|---|---|
| 2008/0060896 A1* | 3/2008 | Saito et al. ................ | 192/40 |
| 2010/0314212 A1 | 12/2010 | Akiyoshi et al. | |
| 2011/0061983 A1* | 3/2011 | Sato et al. ................. | 192/38 |

FOREIGN PATENT DOCUMENTS

| | | |
|---|---|---|
| JP | 2005-140294 | 6/2005 |
| JP | 2006-155834 | 6/2005 |
| JP | 2005-344876 | 12/2005 |
| JP | 2006-266505 | 10/2006 |
| JP | 2008-196653 | 8/2008 |
| JP | 2009-144771 | 7/2009 |
| JP | 2009-293679 | 12/2009 |
| JP | 2009-293761 | 12/2009 |

OTHER PUBLICATIONS

Written Opinion of the International Searching Authority issued Mar. 6, 2012, in International (PCT) Application No. PCT/JP2012/051207 (with English translation).

Japanese Office Action issued Mar. 10, 2015 in corresponding Japanese Patent Application No. 2014-127815 (with partial English translation).

* cited by examiner

ROTATION TRANSMISSION DEVICE

TECHNICAL FIELD

This invention relates to a rotation transmission device used to selectively transmit and not transmit power.

BACKGROUND ART

JP Patent Publication 2009-293679A discloses a conventional rotation transmission device for selectively transmitting driving force to the front wheels, i.e. auxiliary drive wheels, of a front-engine-rear-drive (FR)-based four-wheel drive vehicle.

The rotation transmission device disclosed in JP Patent Publication 2009-293679A includes a control retainer and a rotary retainer mounted between an outer ring and an inner ring mounted in the outer ring such that crossbars of each retainer are arranged circumferentially alternating with the crossbars of the other retainer, opposed pairs of rollers, each pair being received in a pocket defined between each adjacent pair of crossbars, and elastic members disposed between the respective opposed pairs of rollers and biasing the respective pairs of rollers away from each other to a standby position where the rollers can instantly engage a cylindrical surface formed on the inner periphery of the outer ring and cam surfaces formed on the outer periphery of the inner ring. When the inner ring is rotated in one direction while the rollers are in the standby position, one of each opposed pair of the rollers engages the cylindrical surface and the cam surface, so that the rotation of the inner ring is transmitted to the outer ring.

This device further includes an electromagnetic clutch mounted on an input shaft connected to the inner ring for axially moving the control retainer. When the control retainer is moved by the electromagnetic clutch, the control retainer and the rotary retainer are rotated relative to each other in the direction in which the circumferential widths of the pockets decrease by the action of a torque cam provided between the opposed surfaces of flanges of the control retainer and the rotary retainer. When the retainers are rotated in this direction, the opposed pairs of rollers are pushed by the respective crossbars to a disengaged position. Thus, no rotation is transmitted from the inner ring to the outer ring in this state.

In this rotation transmission device, when the control retainer is moved in the direction in which the flange of the control retainer moves away from the flange of the rotary retainer, the control retainer and the rotary retainer are rotated relative to each other in the direction in which the circumferential widths of the pockets increase under the biasing force of the elastic members disposed between the respective opposed pairs of rollers, so that the rollers instantly engage the cylindrical surface and the cam surfaces. Thus the distance by which each roller moves in the rotational direction until it engages is extremely small, so that the rollers can quickly engage.

In the rotation transmission device disclosed in JP Patent Publication 2009-293679A, since the control retainer and the rotary retainer are entirely received in the outer ring, the outer ring is axially long and thus the entire rotation transmission device is heavyweight.

SUMMARY OF THE INVENTION

An object of the present invention is to provide a rotation transmission device which includes an outer ring short in axial length, whereby the entire rotation transmission device is lightweight, and of which the rollers can be accurately engaged and disengaged.

In order to achieve this object, the present invention provides a rotation transmission device comprising an outer ring having an inner periphery, an inner ring mounted in the outer ring and having an outer periphery, wherein a cylindrical surface is formed on one of the inner periphery of the outer ring and the outer periphery of the inner ring, and a plurality of pairs of circumferentially spaced apart cam surfaces are formed on the other of the inner periphery of the outer ring and the outer periphery of the inner ring, whereby wedge-shaped spaces are defined between the respective cam surfaces and the cylindrical surface, a plurality of opposed pairs of rollers received in the respective adjacent pairs of wedge-shaped spaces, elastic members disposed between the respective opposed pairs of rollers and biasing the respective opposed pairs of rollers away from each other, retainers retaining the rollers and comprising a control retainer and a rotary retainer, wherein each of the control retainer and the rotary retainer comprises a flange axially facing the flange of the other retainer, and a plurality of circumferentially spaced apart crossbars provided at an outer peripheral portion of the flange and arranged circumferentially alternating with the crossbars of the other retainer, whereby the respective adjacent pairs of crossbars define pockets, wherein each of the opposed pairs of rollers and each of the biasing members are mounted in each of the pockets, a torque cam provided between opposed surfaces of the flanges of the control retainer and the rotary retainer and configured to rotate the retainers relative to each other in a direction in which circumferential widths of the pockets decrease, when the control retainer is moved in a direction in which the distance between the flanges decreases, and an electromagnetic clutch mounted on an input shaft supporting the inner ring and configured to axially move the control retainer, wherein the electromagnetic clutch comprises an armature supported so as to be movable in an axial direction of the input shaft, a rotor axially facing the armature, and an electromagnet axially facing the rotor and configured to attract the armature into contact with the rotor when the electromagnet is energized, wherein the armature is coupled to the control retainer so as to axially move the control retainer, wherein the control retainer and the rotary retainer are mounted such that the crossbars are disposed between the outer ring and the inner ring and the flanges are disposed between the outer ring and the armature, wherein the armature has a coupling tube provided at an outer peripheral portion of the armature, wherein the control retainer has a tubular portion provided at an outer peripheral portion of the flange of the control retainer and press-fitted in or on the coupling tube of the armature, and wherein the input shaft has a slide guide surface movably supporting a radially inner surface of the armature, and a slide guide surface movably supporting a radially inner surface of the flange of the control retainer.

By mounting the control retainer and the rotary retainer such that their flanges, which axially face each other, are disposed between the outer ring and the armature, it is possible to reduce the axial length of the outer ring compared to a conventional arrangement in which the control retainer and the rotary retainer are both entirely received in the outer ring.

By press-fitting the coupling tube of the armature in or on the tubular portion formed at the outer peripheral portion of the flange of the control retainer, the armature can be fixedly coupled to the control retainer. By further movably supporting the radially inner surface of the armature and the radially inner surface of the flange of the control retainer on the respective axially spaced apart two slide guide surfaces, the armature can be kept always parallel to the rotor.

Thus, the gap between the opposed surfaces of the armature and the rotor is always uniform over the entire circumference, which makes it possible to reliably magnetically attract the armature to the rotor by energizing the electromagnet. Thus, the rollers can be accurately engaged and disengaged.

Preferably, the input shaft is made of a non-magnetic metal, or the armature is movably supported on a ring made of a non-magnetic material and fitted on the input shaft. With this arrangement, it is possible to prevent magnetic flux leakage from the armature into the input shaft, which in turn makes it possible to use a smaller electromagnet.

The non-magnetic material forming the ring may be a non-magnetic metal or a resin. If the ring is made of a resin, the resin is preferably a self-lubricating resin such as polyacetal (POM), polyamide (PA), polytetrafluoroethylene (PTFE) or a polyphenylene sulfide (PPS), because such resin reduces slide resistance of the armature, allowing smooth axial movement of the armature.

The elastic members biasing the respective opposed pairs of rollers away from each other may be coil springs having a rectangular section or coil springs having an elliptical section. These springs can press the rollers substantially over the entire axial length of the respective rollers, thus preventing skew of the rollers. With this arrangement, it is possible to reduce the number of parts compared to a conventional arrangement in which each opposed pair of rollers are biased by a plurality of cylindrical coil springs.

If this type of elastic members are used, the inner ring preferably has flat spring support surfaces on the outer periphery thereof which support long sides of the respective elastic members to stabilize the attitude of the elastic members, thereby effectively pressing the rollers.

In another arrangement, the rotation transmission device further includes a housing covering the outer ring and the electromagnetic clutch and having a closed first end formed with a bearing tube rotatably supporting the output shaft, and a dust cover covering the open end of the bearing tube, in which the electromagnet of the electromagnetic clutch is fitted in the opening of the housing at the second end thereof such that the electromagnet serves as a cover for the housing. With this arrangement, the two-way clutch and the electromagnetic clutch are better protected against damage due to collision of foreign matter such as stones.

In this arrangement, in which the electromagnetic coil is protected by the housing, if the electromagnet rotates relative to the housing, the lead cable extending from the electromagnetic coil could be twisted and broken. To prevent this, an anti-rotation groove is formed in one of the radially outer surface of a core of the electromagnet supporting the electromagnetic coil and the radially inner surface of the housing, and a protrusion is formed on the other which is engaged in the anti-rotation groove, thereby preventing rotation of the electromagnet.

According to the present invention, since the control retainer and the rotary retainer are arranged such that their flanges, which axially face each other, are disposed between the outer ring and the armature, it is possible to reduce the axial length of the outer ring and thus to reduce the weight of the rotation transmission device.

By press-fitting the coupling tube formed on the outer periphery of the armature in or on the tubular portion formed at the outer peripheral portion of the flange of the control retainer, the armature can be fixedly coupled to the control retainer. By further movably supporting the radially inner surface of the armature and the radially inner surface of the flange of the control retainer on the respective slide guide surfaces, the armature can be kept always parallel to the rotor. This in turn makes it possible to reliably magnetically attract the armature to the rotor by energizing the electromagnet, and thus to accurately engage and disengage the rollers.

BRIEF DESCRIPTION OF THE DRAWINGS

FIG. 7($b$) is a sectional view showing a different elastic member.

FIG. 9($b$) is a plan view showing an operational state.

DETAILED DESCRIPTION OF THE INVENTION

Figure 1:
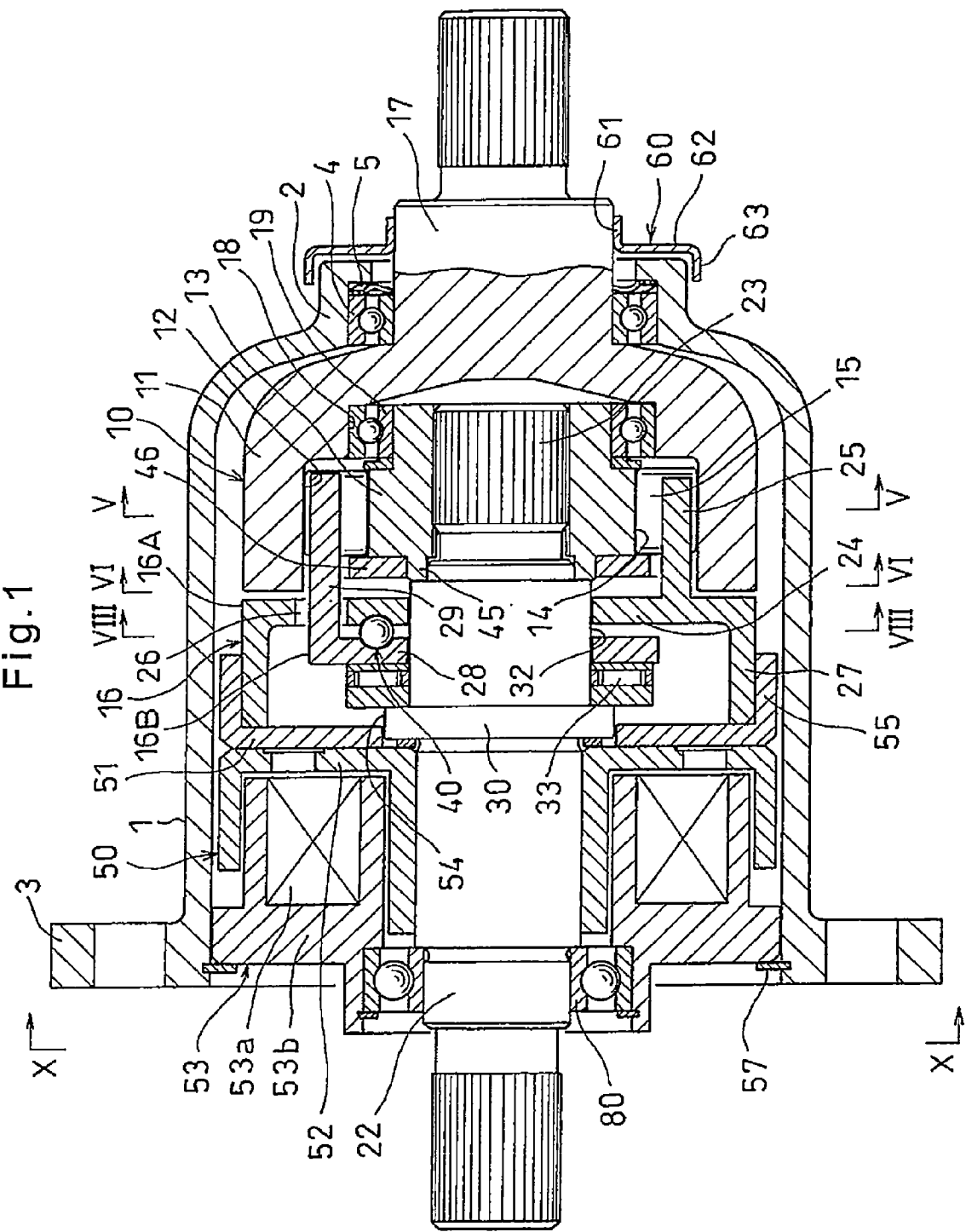
FIG. 1 is a vertical sectional front view of a rotation transmission device embodying the present invention.

Now the embodiment of the present invention is described. FIG. 1 shows the rotation transmission device embodying the present invention. As shown, this rotation transmission device includes a housing 1, a two-way clutch 10 mounted in the housing 1, and an electromagnetic clutch 50 mounted in the housing 1 and configured to selectively engage and disengage the two-way clutch 10.

The housing 1 is a cylindrical member having a small-diameter bearing tube 2 at a first end thereof and an outwardly extending mounting flange 3 at a second end thereof.

Figure 5:
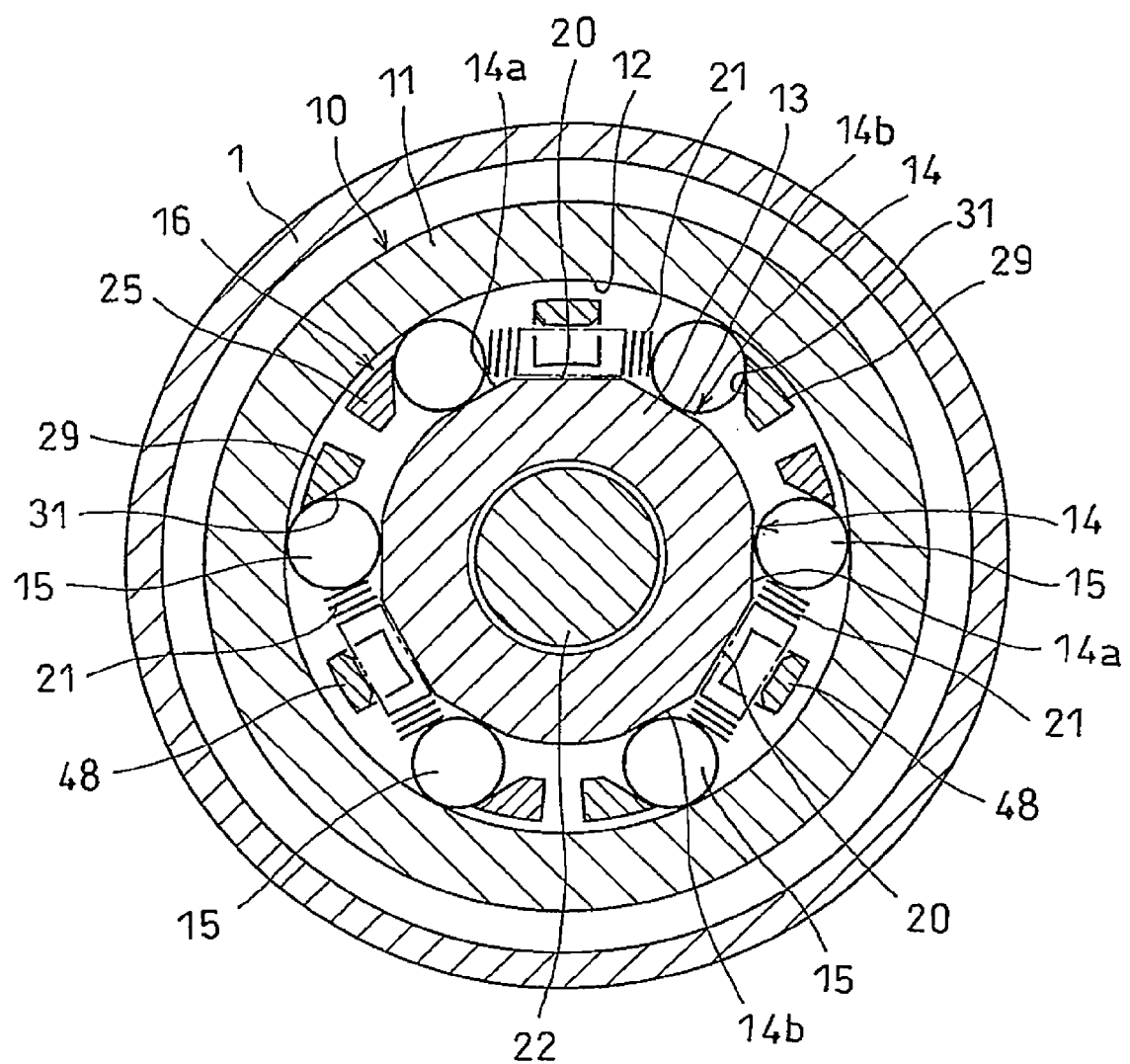
FIG. 5 is a sectional view taken along line V-V of FIG. 1.

As shown in FIGS. 1 and 5, the two-way clutch 10 includes an outer ring 11 formed with a cylindrical surface 12 on its inner periphery, an inner ring 13 mounted in the outer ring 11 and formed with a plurality of adjacent pairs of cam surfaces 14 on its outer periphery, the respective pairs being circumferentially equidistantly spaced apart from each other. A plurality of pairs of rollers 15 are mounted between the respective pairs of cam surfaces 14 and the cylindrical surface 12 and retained by retainers 16. The clutch 10 is configured such that when the inner ring 13 rotates in one direction, one of each pair of the rollers 15 engages the corresponding cam surface 14 and the cylindrical surface 12, and when the inner ring 13 rotates in the other direction, the other of each pair of the rollers 15 engages the corresponding cam surface 14 and the cylindrical surface 12, thereby transmitting the rotation of the inner ring 13 to the outer ring 11.

The outer ring 11 has a closed end formed with an output shaft 17 inserted in the bearing tube 2 of the housing 1 such that its distal end protrudes from the bearing tube 2. A bearing 4 and a wave spring 5 are mounted in the bearing tube 2. The bearing 4 rotatably supports the output shaft 17.

A small-diameter recess 18 is formed in the inner end surface of the closed end of the outer ring 11. A bearing 19 is mounted in the recess 18 which supports the outer ring 11 and the inner ring 13 so as to be rotatable relative to each other.

As shown in FIG. 5, each adjacent pair of the cam surfaces 14, which are formed on the outer periphery of the inner ring 13, are made up of inclined surfaces 14a and 14b inclined in opposite directions to each other. Each of the inclined surfaces 14a and 14b defines, in cooperation with the cylindrical surface 12, a wedge-shaped space which narrows toward the respective circumferential ends thereof. A flat spring support surface 20 is formed on the inner ring 13 between each pair of the inclined surfaces 14a and 14b to extend in the tangential direction of the inner ring 13. Elastic members 21 are supported on the respective spring support surfaces 20.

Figure 7A:
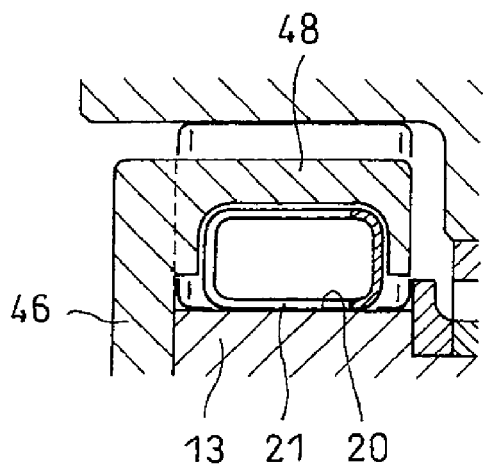
FIG. 7($a$) is a sectional view taken along line VII-VII of FIG. 6.
Figure 7B:
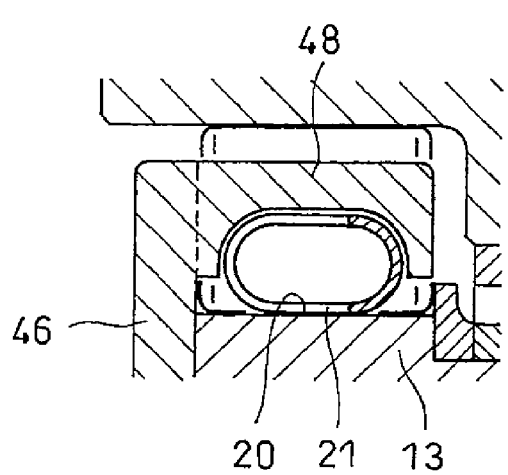

The elastic members 21 may be coil springs having a rectangular cross-section as shown in FIG. 7(a), but are not limited thereto. For example, the elastic members 21 may be coil springs having an elliptical cross-section as shown in FIG. 7(b). The elastic members 21 are mounted between the respective pairs of rollers 15 with their long sides supported on the respective spring support surfaces 20 so as to press the respective pairs of rollers 15 over their entire length, thereby biasing the respective pairs of rollers 15 away from each other.

As shown in FIG. 1, an input shaft 22 made of a non-magnetic metal has its end fitted in the inner ring 13. The inner ring 13 and the input shaft 22 are rotationally fixed together by means of serrations 23 formed on the input shaft at its portion fitted in the inner ring.

Figure 8:
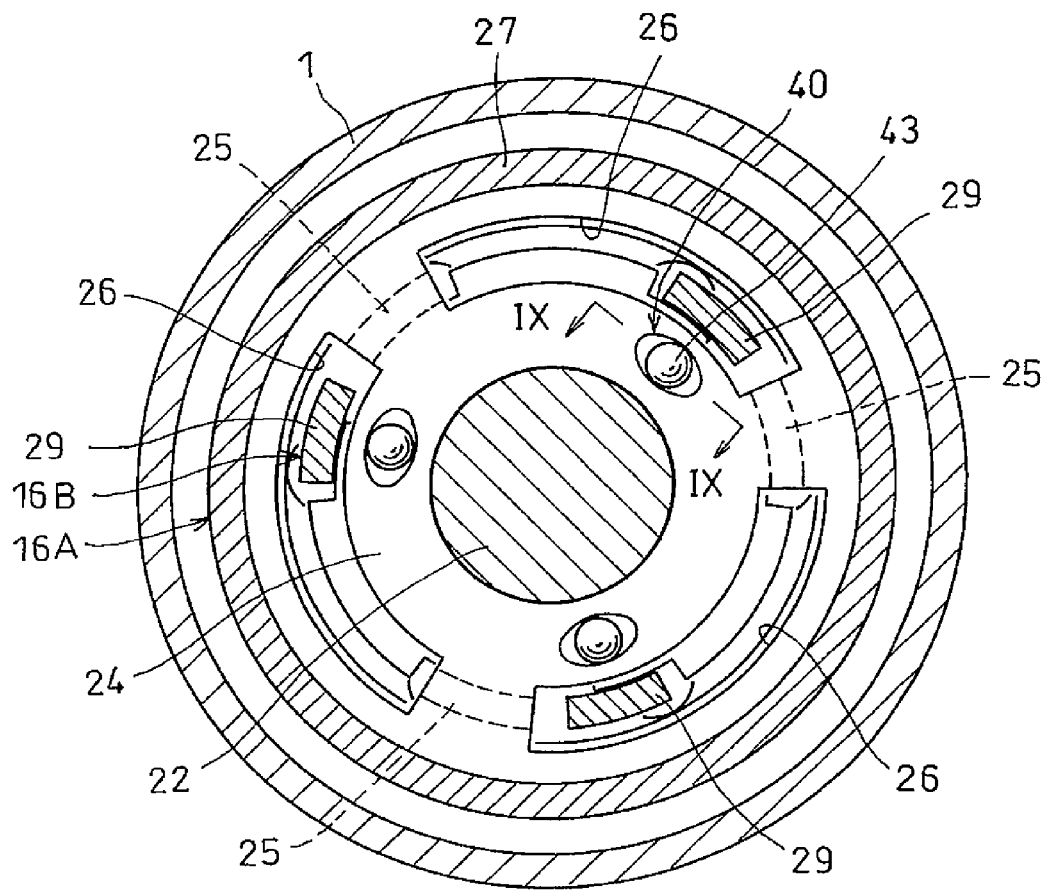
FIG. 8 is a sectional view taken along line VIII-VIII of FIG. 1.

The retainers 16 include a control retainer 16A and a rotary retainer 16B. As shown in FIGS. 1 and 8, the control retainer 16A includes an annular flange 24, and circumferentially equidistantly spaced apart crossbars 25 equal in number to the number of pairs of the cam surfaces 14 and extending from an outer peripheral portion of the annular flange 24. Circular arc-shaped elongated holes 26 are defined between the adjacent crossbars 26. The control retainer 16A further includes a tubular portion 27 extending from the outer edge of the annular flange 24 in the direction opposite to the direction in which the crossbars 25 extend.

The rotary retainer 16B includes an annular flange 28, and circumferentially equidistantly spaced apart crossbars 29 equal in number to the number of pairs of the cam surfaces 14 and extending from an outer peripheral portion of the annular flange 28.

The control retainer 16A and the rotary retainer 16B are arranged such that their respective crossbars 25 and 29 are arranged circumferentially alternating with each other with the crossbars 29 of the rotary retainer 16B inserted in the respective elongated holes 26 of the control retainer 16A. In this state, the crossbars 25 and 29 have their distal ends located between the outer ring 11 and the inner ring 13 with the flange 24 of the control retainer 16A and the flange 28 of the rotary retainer 16B located between a flange 30 formed on the outer periphery of the input shaft 22 and the outer ring 11.

Further in this state, as shown in FIG. 5, pockets 31 are defined between the respective adjacent pairs of the crossbars 25 of the control retainer 16A and the crossbars 29 of the rotary retainer 16B. The pockets 31 radially face the respective pairs of the cam surfaces 14. Each opposed pair of the rollers 15 and the elastic member 21 disposed therebetween are received in each pocket 31.

As shown in FIG. 1, the flange 24 of the control retainer 16A and the flange 28 of the rotary retainer 16B are slidably supported on a slide guide surface 32 formed on the outer periphery of the input shaft 22. A thrust bearing 33 is mounted between the flange 28 of the rotary retainer 16B and the flange 30 of the input shaft 22.

Figure 2:
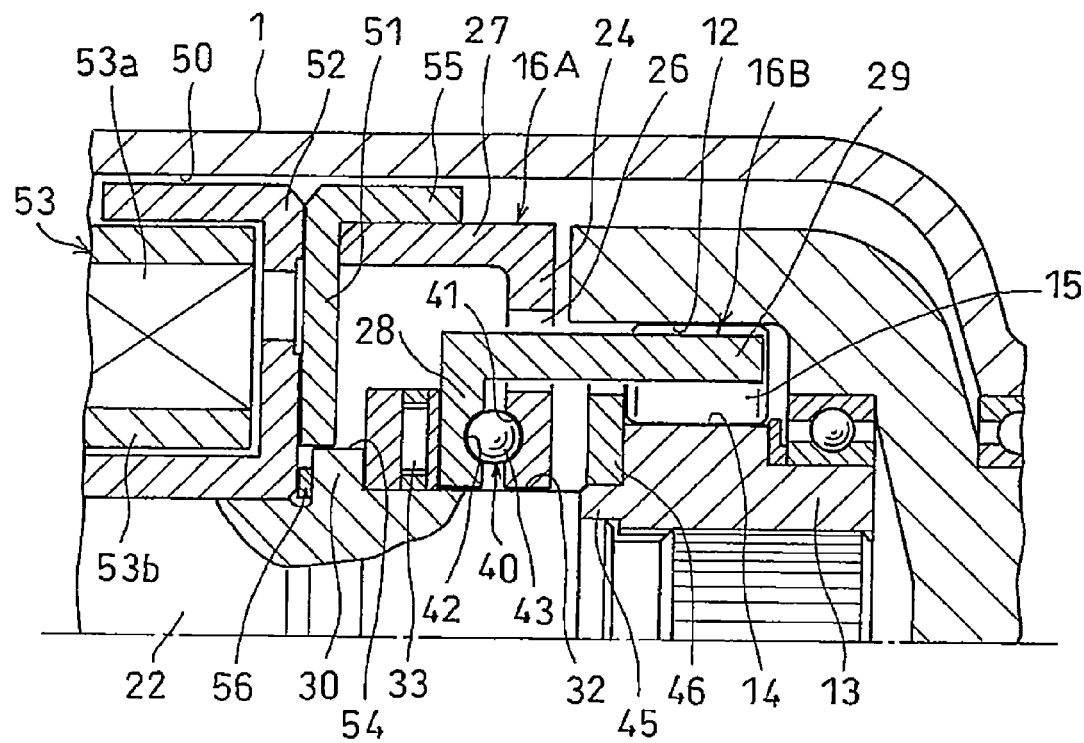
FIG. 2 is an enlarged sectional view of a portion of FIG. 1.
Figure 9A:
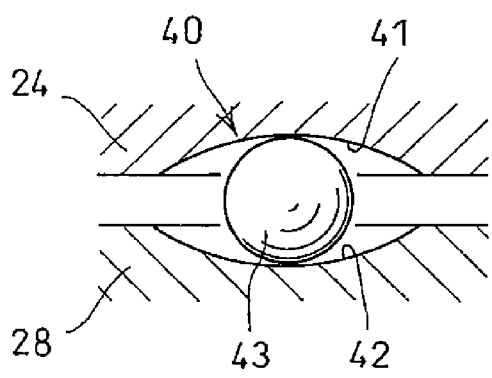
FIG. 9($a$) is a sectional view taken along IX-IX of FIG. 8.
Figure 9B:
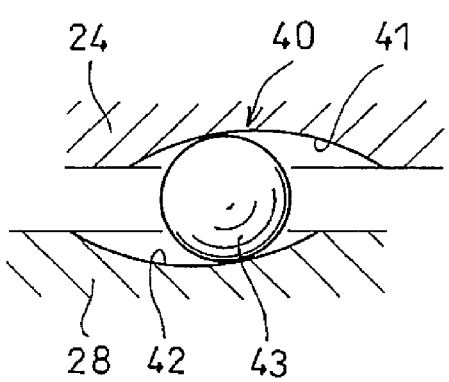

As shown in FIGS. 2, 8 and 9(b), a torque cam 40 is provided between the flange 24 of the control retainer 16A and the flange 28 of the rotary retainer 16B. The torque cam 40 includes opposed pairs of cam grooves 41 and 42 formed in respective opposed surfaces of the flange 24 of the control retainer 16A and the flange 28 of the rotary retainer 16B. Each of the grooves 41 and 42 is the deepest at their circumferentially central portion and narrows toward the respective circumferential ends. The torque cam 40 further includes balls 43 each received between first circumferential end portions of the respective cam grooves 41 and second circumferential end portions of the respective cam grooves 42.

The cam grooves 41 and 42 shown have a circular arc section. But the cam grooves according to the present invention may be V-shaped grooves.

The torque cam 40 is configured such that when the control retainer 16A moved in the axial direction in which the flange 24 of the control retainer 16A approaches the flange 28 of the rotary retainer 16B, the balls 43 roll to the deepest portions of the respective cam grooves 41 and 42 as shown in FIG. 9(a), thereby rotating the control retainer 16A and the rotary retainer 16B relative to each other in the direction in which the circumferential widths of the pockets 31 decrease.

Figure 6:
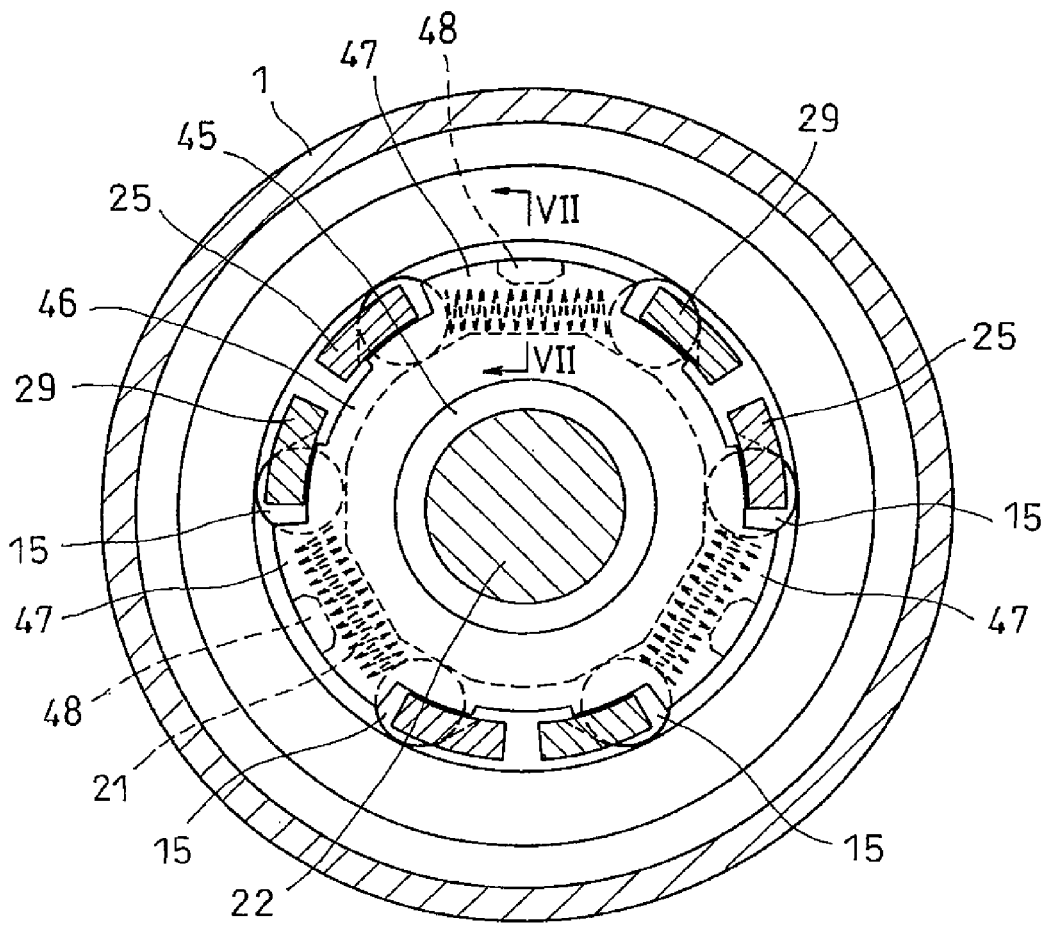
FIG. 6 is a sectional view taken along line VI-VI of FIG. 1.

As shown in FIGS. 1 and 6, the inner ring 13 is formed with a tubular portion 45 on its second end surface. An annular retaining plate 46 is fitted on the tubular portion 45 and fixed to the inner ring 13. The retaining plate 46 is formed with a plurality of anti-rotation pieces 47 on its outer peripheral surface which are received in the respective pockets 31 defined between the crossbars 25 of the control retainer 16A and the crossbars 29 of the rotary retainer 16B.

The anti-rotation pieces 47 are configured such that when the control retainer 16A and the rotary retainer 16B rotate relative to each other in the direction in which the circumferential widths of the pockets 31 decrease, the crossbars 25 of the control retainer 16A and the crossbars 29 of the rotary retainers 16B are received by the side edges of the anti-rotation pieces 47, thereby keeping the opposed pairs of rollers 15 in the neutral position.

As shown in FIGS. 6, 7(a) and 7(b), the retaining plate 46 has spring presser arms 48 at an outer peripheral portion thereof which protrude into the spaces radially outwardly of the respective elastic members 21, preventing the elastic members 21 from buckling and protruding radially outwardly from the spaces between the respective opposed pairs of rollers 15.

As shown in FIG. 1, the electromagnetic clutch 50 includes an armature 51 axially facing the end surface of the tubular portion 27 formed on the control retainer 16A, a rotor 52 axially facing the armature 51, and an electromagnet 53 axially facing the rotor 52.

As shown in FIG. 2, the armature 51 is fitted on and rotatably and slidably supported by a slide guide surface 54 formed on the outer periphery of the flange 30 of the input shaft 22. The armature 51 has a coupling tube 55 at its outer peripheral portion in which the tubular portion 27 of the control retainer 16A is press-fitted. The armature 51 is thus fixedly coupled to the control retainer 16A. Thus, the armature 51 is practically slidably supported by the axially spaced apart two slide guide surfaces, i.e. the slide guide surface 54 on the outer periphery of the flange 30 and the slide guide surface 32 on the outer periphery of the input shaft 22.

The rotor 52 is fitted on the input shaft 22. The rotor 52 is axially positioned by a positioning ring 56 disposed between the rotor 52 and the flange 30 formed on the outer periphery of the input shaft 22, and is also rotationally fixed to the input shaft 22.

As shown in FIG. 1, the electromagnet 53 includes an electromagnetic coil 53a, and a core 53b supporting the electromagnetic coil 53*a*. The core 53*b* is fitted in the opening of the housing 1 at the second end thereof. A snap ring 57 is fitted in the opening of the housing 1 at the second end to prevent separation of the core 53*b*. The core 53*b* is rotatably supported by the input shaft 22 through a bearing 80 fitted on the input shaft 22.

Figure 10:
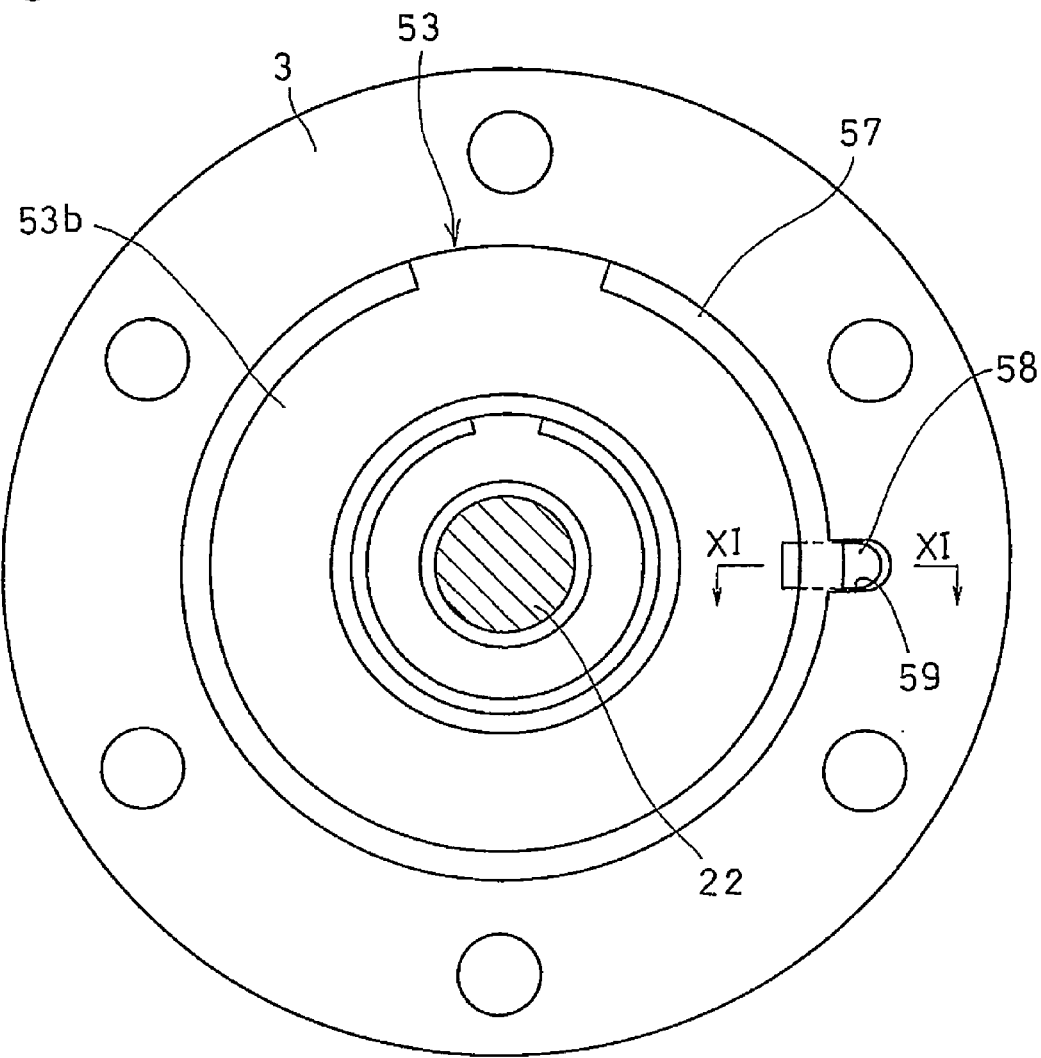
FIG. 10 is a sectional view taken along line X-X of FIG. 1.
Figure 11:
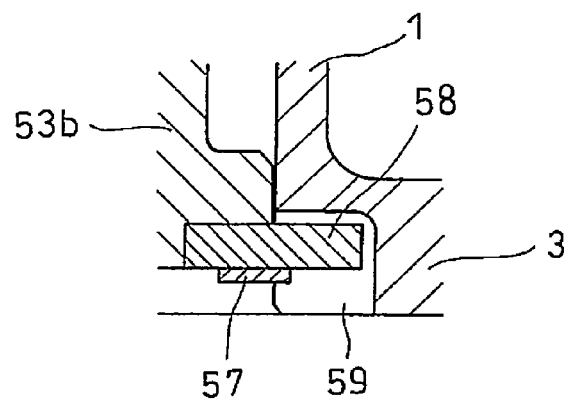
FIG. 11 is a sectional view taken along line XI-XI of FIG. 10.

As shown in FIGS. 10 and 11, the core 53*b* is fitted in the opening with substantially no gap therebetween such that the core 53*b* serves as a cover. The core 53*b* has a protrusion 58 on its outer periphery which is fitted in an anti-rotation groove 59 formed in the inner periphery of the housing 1 at the second end portion thereof, thus preventing rotation of the core 53*b*. This prevents a lead cable (not shown) extending from the electromagnetic coil 53*a* from being twisted and broken.

As shown in FIG. 1, a dust cover 60 is fitted on the end portion of the output shaft 17 protruding from the bearing tube 2 of the housing 1. The dust cover 60 includes a cylindrical portion 61 fitted on the radially outer surface of the output shaft 17, a disk portion 62 provided at one end of the cylindrical portion 61 and axially facing the end surface of the bearing tube 2, and a tubular portion 63 provided at the outer edge of the disk portion 62 and covering the outer periphery of the bearing tube 2 at its distal end portion. The dust cover 60 thus prevents entry of foreign matter into the bearing tube 2.

FIG. 1 shows the rotation transmission device embodying the present invention while the electromagnetic coil 53*a* of the electromagnet 53 is not energized with the armature 51 kept out of contact with the rotor 52. In this state, as shown in FIG. 5, the opposed pairs of rollers 15 of the two-way clutch 10 are in a standby position where the rollers 15 are ready to instantly engage the cylindrical surface 12 of the outer ring 11 and the respective cam surfaces 14 of the inner ring 13. In FIG. 1, the armature 51 appears to be in contact with the rotor 52. But actually, there is a small gap therebetween.

With the two-way clutch 10 in the standby position, when the electromagnetic coil 53*a* is energized, the armature 51 is moved axially and attracted into contact with the rotor 52 under the magnetic attraction force applied to the armature 51.

Since the armature 51 is fixedly coupled to the control retainer 16A, when the armature 51 is moved axially, the control retainer 16A is moved such that its flange 24 approaches the flange 28 of the rotary retainer 16B.

This causes the balls 43 to roll from the position shown in FIG. 9(*b*) to the deepest portions of the respective cam grooves 41 and 41 as shown in FIG. 9(*a*). The control retainer 16A and the rotary retainer 16B thus rotate relative to each other in the direction in which the circumferential widths of the pockets 31 decrease. The respective opposed pairs of rollers 15, which are in the standby position shown in FIG. 5, are thus pushed by the crossbars 25 of the control retainer 16A and the crossbars 29 of the rotary retainer 16B, respectively, and are moved toward each other to a neutral position where the rollers 15 are completely disengaged from the cylindrical surface 12 and the respective cam surfaces 14, and thus the two-way clutch 10 is disengaged.

With the two-way clutch 10 disengaged, when the inner ring 13 is rotated in one direction by applying torque to the input shaft 22, the anti-rotation pieces 47 formed on the retaining plate 46 push either ones of the crossbars 25 of the control retainer 16A and the crossbars 29 of the rotary retainer 16B, thus rotating the control retainer 16A and the rotary retainer 16B together with the inner ring 13. In this state, since the opposed pairs of rollers 15 are in the neutral position where they are not engaged, the rotation of the inner ring 13 is not transmitted to the outer ring 11, so that the inner ring 13 rotates freely.

When the control retainer 16A and the rotary retainer 16B rotate relative to each other in the direction in which the circumferential widths of the pockets 31 decrease, the crossbars 25 of the control retainer 16A and the crossbars 29 of the rotary retainer 16B abut the respective side edges of the anti-rotation pieces 47 of the retaining plate 46, thereby preventing further relative rotation.

The anti-rotation pieces 47 thus prevent the elastic members 21 from being unnecessarily compressed, thus preventing breakage of the elastic members 21 due to fatigue after the elastic members 21 have been repeatedly compressed and expanded.

When the electromagnetic coil 53*a* is deenergized while the inner ring 13 is rotating freely, the magnetic attraction force disappears and the armature 51 becomes rotatable. Thus, under the biasing force of the elastic members 21, the control retainer 16A and the rotary retainer 16B rotate relative to each other in the direction in which the circumferential widths of the pockets 31 increase, thereby moving the respective opposed pairs of rollers 15 to the standby position shown in FIG. 5, where the rollers are ready to instantly engage the cylindrical surface 12 and the cam surfaces 14. Thus, either ones of the respective opposed pairs of rollers 15 actually engage according to the rotational direction of the inner ring, so that torque is transmitted between the inner ring 13 and the outer ring 11 through the engaged ones of the rollers 15.

When, in this state, the input shaft 22 is stopped and then rotated in the opposite direction, the other ones of the respective opposed pairs of rollers 15 engage, and the rotation of the inner ring 13 is transmitted to the outer ring 11 through the other ones of the respective pairs of rollers 15.

With this arrangement, when the electromagnetic coil 53*a* is de-energized, the control retainer 16A and the rotary retainer 16B are adapted to rotate relative to each other in the direction in which the circumferential widths of the pockets 31 increase, to the standby position where the rollers 15 are ready to instantly engage the cylindrical surface 12 and the respective cam surfaces 14. Thus, the distance by which the rollers 15 move in the rotational direction until they engage is short, so that it is possible to instantly transmit the rotation of the inner ring 13 to the outer ring 11.

Since the rollers 15, through which the rotation of the inner ring 13 is transmitted to the outer ring 11, are equal in number to the cam surfaces 19, large torque can be transmitted from the inner ring 13 to the outer ring 11.

When the control retainer 16A and the rotary retainer 16B rotate relative to each other in the direction in which the circumferential widths of the pockets 31 increase, the balls 43 between the respective opposed pairs of cam grooves 41 and 42 roll toward shallow portions of the respective cam grooves 41 and 42 to the position shown in FIG. 9(*b*).

In the embodiment of FIG. 1, since the control retainer 16A and the rotary retainer 16B are arranged such that their crossbars 25 and 29 are disposed between the outer ring 11 and the inner ring 13, with their axially opposed flanges 24 and 28 disposed between the outer ring 11 and the armature 51, it is possible to reduce the axial length of the outer ring 11 and thus its weight.

Since the coupling tube 55 of the armature 51 and the tubular portion 27 formed at the outer peripheral portion of the flange of the control retainer 16A are fixedly press-fitted together, with the radially inner surface of the armature 51 slidably supported by the slide guide surface 54 formed on the outer periphery of flange 30 of the input shaft 22 and with the radially inner surface of the flange of the control retainer 16A slidably supported on the slide guide surface 32 formed on the outer periphery of the input shaft 22, it is possible to support the armature 51 so as to always extend parallel to the rotor 52. This in turn makes it possible to reliably magnetically attract the armature 51 to the rotor 52 by energizing the electromagnet 53, and thus to accurately engage and disengage the rollers 15.

Since the input shaft 22 of the embodiment is made of a non-magnetic metal, magnetic flux leakage from the armature 51 into the input shaft 22 is prevented, which in turn makes it possible to use a smaller electromagnet 53.

Figure 3:
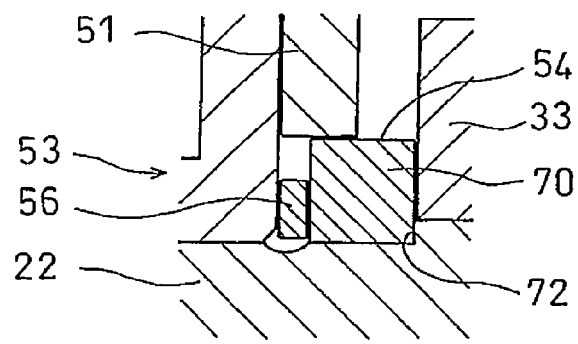
FIG. 3 is a sectional view of a different slide portion movably supporting an armature.
Figure 4:
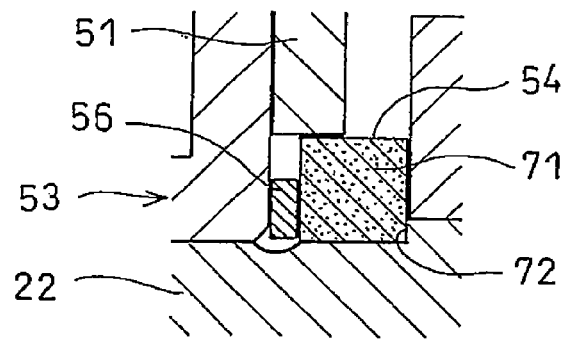
FIG. 4 is a sectional view of a still different slide portion movably supporting the armature.

But instead of using an input shaft 22 made of a non-magnetic metal, a ring 70 made of a non-magnetic metal, as shown in FIG. 3, or a ring 71 made of a resin, as shown in FIG. 4, may be fitted on an input shaft 22 made of a magnetic metal, to prevent magnetic flux leakage.

If the resin ring 71 is used, the resin is preferably a self-lubricating resin such as polyacetal (POM), polyamide (PA), polytetrafluoroethylene (PTFE) or a polyphenylene sulfide (PPS), because such resin reduces slide resistance of the armature 51, allowing smooth axial movement of the armature 51.

The non-magnetic metal ring 70, shown in FIG. 3, and the resin ring 71, shown in FIG. 4, are both axially fixed in position relative to the input shaft 22 by a shoulder 72 formed on the outer periphery of the input shaft 22.

What is claimed is:

1. A rotation transmission device comprising:
an outer ring having an inner periphery;
an inner ring mounted in the outer ring and having an outer periphery, wherein a cylindrical surface is formed on one of the inner periphery of the outer ring and the outer periphery of the inner ring, and a plurality of pairs of circumferentially spaced apart cam surfaces are formed on the other of the inner periphery of the outer ring and the outer periphery of the inner ring, whereby wedge-shaped spaces are defined between the respective cam surfaces and the cylindrical surface;
a plurality of opposed pairs of rollers received in the respective adjacent pairs of wedge-shaped spaces;
elastic members disposed between the respective opposed pairs of rollers and biasing the respective opposed pairs of rollers away from each other;
retainers retaining the rollers and comprising a control retainer and a rotary retainer, wherein each of the control retainer and the rotary retainer comprises a flange axially facing the flange of the other retainer, and a plurality of circumferentially spaced apart crossbars provided at an outer peripheral portion of the flange and arranged circumferentially alternating with the crossbars of the other retainer, whereby the respective adjacent pairs of crossbars define pockets, wherein each of the opposed pairs of rollers and each of the biasing members are mounted in each of the pockets;
a torque cam provided between opposed surfaces of the flanges of the control retainer and the rotary retainer and configured to rotate the retainers relative to each other in a direction in which circumferential widths of the pockets decrease, when the control retainer is moved in a direction in which the distance between the flanges decreases; and
an electromagnetic clutch mounted on an input shaft supporting the inner ring and configured to axially move the control retainer, wherein the electromagnetic clutch comprises an armature supported so as to be movable in an axial direction of the input shaft, a rotor axially facing the armature, and an electromagnet axially facing the rotor and configured to attract the armature into contact with the rotor when the electromagnet is energized, wherein the armature is coupled to the control retainer so as to axially move the control retainer,
wherein the control retainer and the rotary retainer are mounted such that the crossbars are disposed between the outer ring and the inner ring and the flanges are disposed between the outer ring and the armature, wherein the armature has a coupling tube provided at an outer peripheral portion of the armature, wherein the control retainer has a tubular portion provided at an outer peripheral portion of the flange of the control retainer and press-fitted in or on the coupling tube of the armature, and wherein the input shaft has a first slide guide surface movably supporting a radially inner surface of the armature, and a second slide guide surface movably supporting a radially inner surface of the flange of the control retainer.

2. The rotation transmission device of claim 1, wherein the input shaft is made of a non-magnetic metal.

3. The rotation transmission device of claim 1, wherein the input shaft includes a non-magnetic metal ring supporting the armature, and wherein the slide guide surface movably supporting the armature is formed on an outer periphery of the non-magnetic metal ring.

4. The rotation transmission device of claim 1, wherein the input shaft includes a resin ring supporting the armature, and wherein the slide guide surface movably supporting the armature is formed on an outer periphery of the resin ring.

5. The rotation transmission device of claim 4, wherein the resin ring is made of a self-lubricating resin.

6. The rotation transmission device of claim 1, wherein the elastic members comprise coil springs having a rectangular section.

7. The rotation transmission device of claim 6, wherein the inner ring has flat spring support surfaces on the inner periphery thereof which support long sides of the respective elastic members.

8. The rotation transmission device of claim 1, wherein the elastic members comprise coil springs having an elliptical section.

9. The rotation transmission device of claim 8, wherein the inner ring has flat spring support surfaces on the inner periphery thereof which support long sides of the respective elastic members.

10. The rotation transmission device of claim 1, further comprising a housing covering the outer ring and the electromagnetic clutch and having a closed first end formed with a bearing tube, an output shaft rotatably supported by the bearing tube, and a dust cover comprising a disk portion axially facing an end surface of the bearing tube, and a tubular portion provided at an outer peripheral portion of the disk portion and covering an outer periphery of the bearing tube, wherein the electromagnet of the electromagnetic clutch is fitted in an opening of the housing at a second end of the housing such that the electromagnet serves as a cover for the housing.

11. The rotation transmission device of claim 10, wherein the electromagnet comprises an electromagnetic coil and a core supporting the electromagnetic coil, and wherein an anti-rotation groove is formed in one of a radially outer surface of the core and a radially inner surface of the housing near the opening of the housing, and a protrusion is formed on the other of the radially outer surface of the core and the radially inner surface of the housing near the opening of the housing such that the protrusion is engaged in the anti-rotation groove, thereby preventing rotation of the electromagnet.

* * * * *